Aug. 3, 1965  R. M. VOITIK  3,198,529
ROTARY FACE SEAL
Filed March 23, 1962  2 Sheets-Sheet 1

INVENTOR.
Robert M. Voitik,
BY Wolfe, Hubbard, Voit & Osann
Attorneys.

Aug. 3, 1965 R. M. VOITIK 3,198,529
ROTARY FACE SEAL
Filed March 23, 1962 2 Sheets-Sheet 2

INVENTOR.
Robert M. Voitik,
BY Wolfe, Hubbard, Voit & Osann
Attorneys.

United States Patent Office 3,198,529
Patented Aug. 3, 1965

3,198,529
ROTARY FACE SEAL
Robert M. Voitik, Evanston, Ill., assignor to Continental Illinois National Bank and Trust Company of Chicago
Filed Mar. 23, 1962, Ser. No. 181,954
14 Claims. (Cl. 277—3)

This invention relates to rotary seals for restricting fluid leakage along shafts passing through relatively rotatable housings and concerns, more particularly, a face seal type of rotary seal.

A face seal is one which depends upon the rubbing contact of two relatively rotating sealing faces for its sealing effect. Conventionally, a "rotor" is secured to a rotating shaft and a "stator" is secured to a housing through which the shaft passes. The rotor and the stator are formed with radial, annular sealing surfaces which abut to produce a seal between the shaft and the housing. The sealing surfaces rub together as the shaft rotates and, thus, one surface or the other is normally formed of a bearing material.

When fluid pressure is applied against a face seal, there is a certain amount of penetration by the fluid between the sealing faces, the amount of penetration depending on the pressure of the fluid as offset by the force urging the stator and rotor together. To avoid pop-off, i.e., separation of the sealing faces, face seals are conventionally disposed so that the fluid under pressure substantially embraces the stator whereby the fluid develops a force urging the sealing faces together. In other words, the stator is placed in a deliberately unbalanced condition so that the development of fluid pressure against the seal creates a greater force urging the stator against the rotor than is created in the opposite direction by the penetration of fluid between the sealing faces.

As a result of the above unbalance, the magnitude of the force urging the sealing faces of the face seal into rubbing contact is directly related to the pressure of the fluid being sealed. Thus, the limitations of excessive friction and undesirable wear have restricted face seals to applications where the pressure of the fluid to be sealed is not great. As a practical matter, face seals cannot ordinarily be used to seal pressures above 350 or 400 p.s.i. Thus, while face seals are quite efficient, their use in high pressure applications has not been possible.

In view of the above, it is the primary aim of the present invention to provide a novel face seal capable of effectively sealing fluids at very high pressures without excessive friction and wear. Seals of the invention can be used in applications where the fluid pressures reach values of 1,500, or even 2,500, p.s.i.

It is also an object to provide a face seal of the above type having a greatly increased service life whether the seal is utilized in high or low pressure applications.

More specifically, it is an object to provide a novel face seal in which the rubbing frictional contact of the sealing faces is self-limiting so that an optimum pressure between the sealing faces can be established and will be maintained despite the magnitude of the fluid pressure and variations in the other factors normally affecting sealing face pressure.

A further object is to provide a face seal of the above character which is particularly reliable in that a substantial amount of fluid pressure unbalance can be provided to avoid inadvertent pop-off without the unbalance causing excessive frictional contact of the sealing faces as in a conventional seal.

Another object is to provide a face seal as characterized above which is economical and efficient for high pressure applications since it effectively replaces special sealing devices formerly required to handle high fluid pressures.

It is still another object to provide a rotary seal as described above which is contained in a single "package" or cartridge for convenience in handling and mounting.

Other objects and advantages of the invention will become apparent upon reading the following detailed description and upon reference to the drawings, in which.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Figure 1:
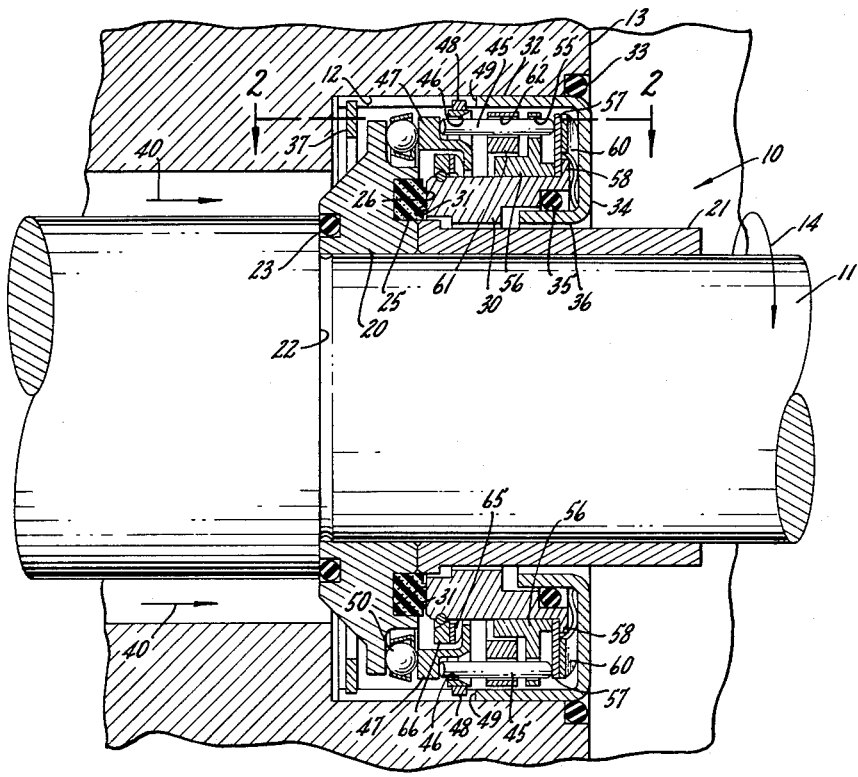
FIGURE 1 is an axial section of a rotary seal embodying the present invention.
Figure 2:
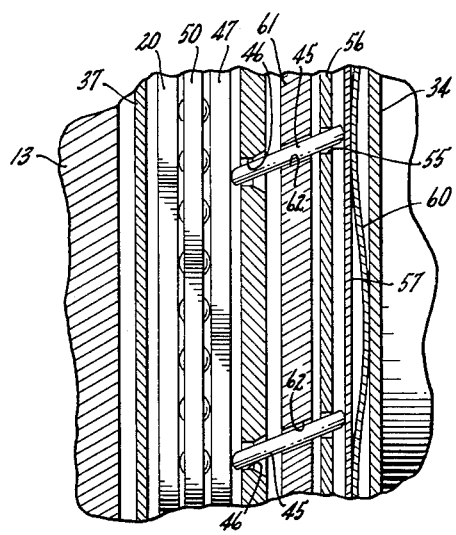
FIG. 2 is a developed section taken in a plane indicated by the line 2—2 in FIG. 1.

Turning first to FIGURE 1, there is shown a rotary seal 10 embodying the invention and arranged to restrict fluid leakage along a shaft 11 which passes through an opening 12 in a wall or housing 13. The shaft 11 and the housing 13 are relatively rotatable and, in the illustrated assembly as in the typical practical case, the housing 13 is the stationary part and the shaft 11 rotates in the direction of the arrow 14.

The seal 10 is a face seal and includes an annular rotor 20 secured to the shaft 11 by a clamp sleeve 21 which urges the rotor against a shoulder 22 formed on the shaft. An O-ring seal 23 is interposed between the shoulder 22 and the rotor 20 so as to prevent fluid leakage between the rotor and the shaft 11.

The rotor 20 includes a seal ring 25 defining a radially extending sealing surface 26. The seal ring 25 is preferably formed of a bearing material such as carbon.

Cooperating with the rotor 20 is an annular stator 30 surrounding the shaft 11 and having a radial sealing surface 31 facing, and in sealing engagement with, the rotor sealing surface 26. The stator 30 is sealed to the housing 13 through a case or cup 32 which contains the parts of the seal 10 in a single package or cartridge. The cup 32 is closely fitted with the opening 12 and is preferably sealed to the housing 13 by an O-ring seal 33. The cup 32 is formed with an end wall 34 which faces and is axially spaced from the rotor 20. The stator 30 is disposed between the end wall 34 and the rotor and is sealed to the cup 32 by a secondary seal in the form of an O-ring 35 that is sandwiched between the stator 30 and a circular flange 36 formed at the inner edge of the end wall 34.

The stator 30 is thus mounted so as to permit limited axial movement of the stator within the cup 32 toward and away from the rotor 20. In the illustrated construction, a retaining ring 37 is snapped in the open end of the cup 32 so as to overhang the rotor 20 and complete the seal package.

The seal 10 is intended to function with fluid pressure moving against the seal from left to right in the direction of arrows 40. The sealed fluid, under pressure, thus acts against the secondary seal 35 and the adjacent surfaces of the stator 30 so as to urge the sealing surfaces 26, 31 together. While there is some penetration of the fluid being sealed between the sealing surfaces 26, 31, the greater opposing area on the opposite end of the stator 30 creates an unbalance so that the greater the fluid pressure being sealed, the greater is the force urging the surfaces 26, 31 together. Upon rotation of the shaft 11 in the direction of the arrow 14, there is therefore rubbing contact between the sealing surfaces 26, 31 which creates a torque tending to turn the stator 30 in the direction of shaft rotation. This torque increases as the force urging the sealing surfaces together increases and, hence, the magnitude of the torque acting on the stator 30 is directly related to the pressure of the fluid being sealed.

In accordance with the invention, a portion of the torque acting on the stator 30 is converted into a force tendforce urging the stator 30 against the rotor 20 is self-limiting. To generate this reverse acting or feedback force, the stator 30 is mounted for limited rotational movement relative to the housing 13 under the urging of the torque exerted on the stator, and a plurality of axially inclined pins 45 couple the stator and the housing so as to shift the stator from the rotor 20 incident to the limited rotational movement of the stator. In the preferred construction, six pins 45 are equally spaced peripherally about the rotor 20. One end of each pin 45 is fitted in a socket 46 formed in a pivot ring 47 which is secured to the cup 32 against rotation by a pair of radially projecting pins 48 received in slots 49 formed in the cup. The pivot ring 47 is blocked against axial movement by a friction reducing thrust bearing 50 which is interposed between the rotor 20 and the pivot ring 47.

The opposite ends of the pins 45 are fitted through openings 55 formed in a pin spacer 56 which is press fitted about the periphery of the stator 30. These pin ends bear against a flexible, radially extending washer 57 which is fixed on the stator 30 by being tightly sandwiched between the pin spacer 56 and a lip 58 formed on the periphery of the stator.

To summarize quite briefly the operation of the seal 10, an increase in the pressure of the fluid being sealed tends to increase the force on the stator 30 urging the sealing surfaces 26, 31 together. This acts to increase the torque on the stator 30 resulting from the rotation of the shaft 11 and the rubbing frictional contact between the sealing surfaces 26, 31. Since the stator 30 is mounted for limited rotational movement, this torque tends to rotate the stator in the direction that acts to straighten the inclined pins 45, and thus the pins wedge the stator 30 from the rotor 20. One end of each pin acts through the flexible washer 57 against the stator and the opposite ends of the pins act against the pivot ring 47 and the interposed thrust bearing 50 against the rotor 20.

For establishing initial sealing contact between the sealing surfaces 26, 31 before fluid pressure acts against the stator 30, a main spring 60 of the annular wave form is sandwiched between the cup end wall 34 and the flexible washer 57. To positively limit the range through which the pins 45 may tilt, a pin guide 61 is floatingly mounted between the pivot ring 47 and the pin spacer 56. The pin guide 61 is formed with a plurality of peripherally spaced, inclined openings 62 which freely clear the pins 45 so long as the pins remain at their approximate proper angles but which act as stops limiting the range through which the pins may tilt.

The preferred construction also includes a preload spring 65 of an annular wave configuration which acts against the pivot ring 47 so as to urge it from the thrust bearing 50. The preload spring 65 is anchored by ring 66 which is locked on the periphery of the stator 30. The effect of the preload spring 65 is to cause the seal 10 to act as a conventional face seal until sufficient torque has been developed by the rubbing contact between the sealing surfaces 26, 31 to rotate the stator 30 and tilt the pins 45 against the force of the preload spring so that the pins 45 act, through the thrust bearing 50, to wedge apart the rotor 20 and the stator.

It is believed that a full appreciation of the operation of the seal 10 can now be obtained. Under static conditions and upon initial rotation of the shaft 11 relative to the housing 13 in the direction of the arrow 14, the main spring 60 urges the stator 30 against the rotor 20 so that a sealing contact is maintained between the sealing surfaces 26, 31. The main spring 60 does not exert enough force against the stator 30 to develop sufficient torque on the stator to straighten the pins 45 against the force exerted by the preload spring 65.

However, as the pressure of the fluid being sealed builds up and acts against the seal 10 in the direction of the arrows 40, the unbalanced design of the stator 30 causes the fluid pressure to urge the stator 30 against the rotor with ever increasing force. This, in turn, increases the torque acting on the stator 30 until the pins 45 are straightened sufficiently to begin a wedging action tending to separate the rotor and the stator. Thus, the torque developed at the sealing surfaces 26, 31 is fed back through the pins 45 to limit the axial force directed against the stator 30.

This feedback force not only provides a direct mechanical load relief acting in opposition to the fluid pressure forces urging the sealing surfaces 26, 31 together, but also triggers a controlled amount of penetration of the fluid between the sealing surfaces. That is, by lessening the forces urging the stator against the rotor, a greater amount of fluid can penetrate between the sealing surfaces 26, 31 and this penetration, of course, further serves to counterbalance the fluid pressure forces urging the stator against the rotor.

As the direct mechanical load relief, and the amount of penetration between the sealing surfaces, increases, the amount of friction between the sealing surfaces 26, 31 and the resulting torque on the stator 30 decreases so as to reduce the feedback force. The forces acting on the stator thus tend to balance out and tests have indicated that, as a result of this balanced feedback action, a seal exemplified by the seal 10 can effectively operate in applications requiring the sealing of fluid at pressures ranging from 1,500 to 2,500 p.s.i.

Since the rotor 20 and the thrust bearing 50 move with the shaft 11, axial or slight eccentric movement of the shaft does not affect the abutment against which the pins 45 react and, hence, the angular disposition of the pins and the feedback force which they develop are not affected by axial shifting movement or slight eccentricity of the shaft. Furthermore, the radially extending flexible washer 57 provides a slight resilience between the ends of the pins 45 and the stator 30 which tends to equalize the forces exerted by the several pins so that, in effect, the effective lengths of the pins are made uniform.

It has been found that the proper angle of inclination of the pins 45 relative to the axis of the shaft 11 and the seal 10 is within the range 15° to 20°. At this angle, effective feedback is obtained without danger of the pins overcentering and, at this approximate angle, the inclined pin arrangement embodied in the seal 10 very efficiently converts torque into an axial force.

It should also be mentioned that because of the existence of the feedback force developed by the inclined pins 45, the stator 30 can be designed with a greater amount of fluid pressure unbalance than might normally be desirable. That is, the stator can be sealed to the cup 32 at a point which will cause an appreciable amount of fluid pressure unbalance tending to urge the stator against the rotor. This amount of unbalance, relatively high as compared to standard face seals, minimizes the danger of inadvertent pop-off and loss of sealing effectiveness caused by sudden separation of the sealing faces 26, 31.

Figure 3:
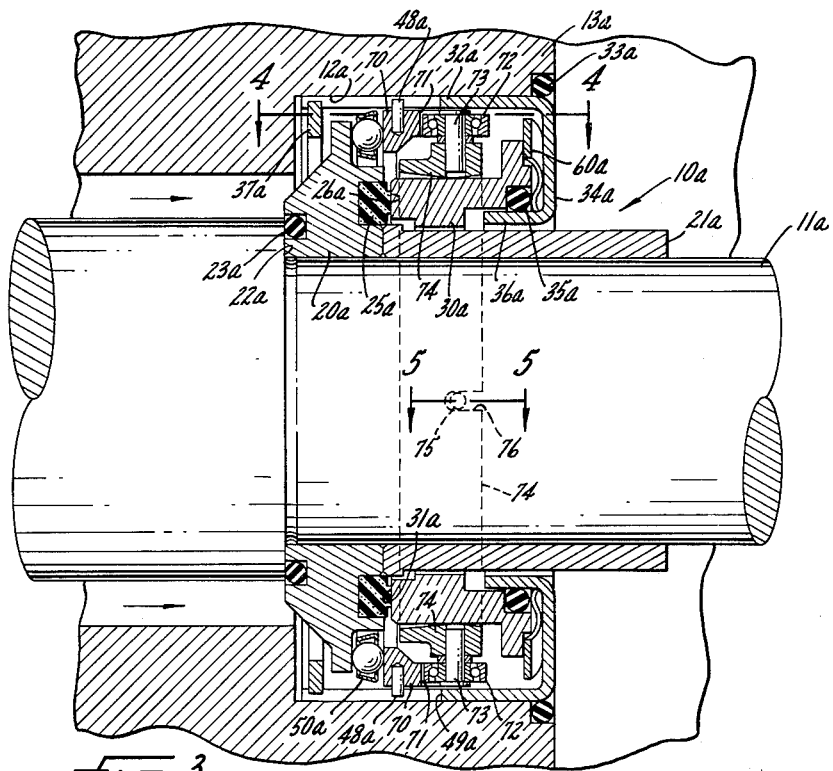
FIG. 3 is an axial section of a second type of seal also embodying the invention.
Figure 4:
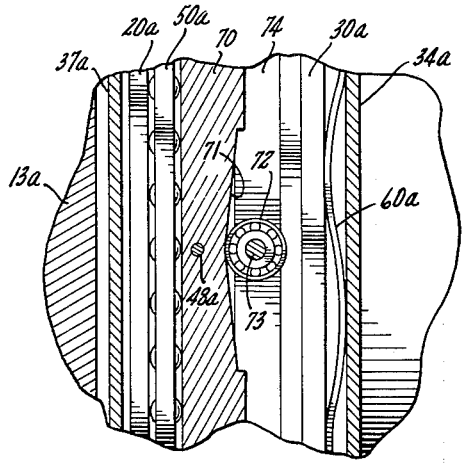
FIG. 4 is a developed section taken in a plane indicated by the line 4—4 in FIG. 3.
Figure 5:
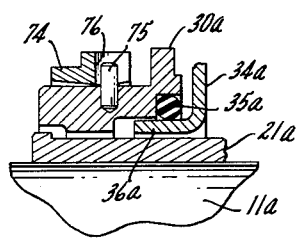
FIG. 5 is a fragmentary section taken approximately along the line 5—5 in FIG. 3.

Turning next to the embodiment of the invention shown in FIGS. 3 to 5, parts corresponding to those described in connection with the seal 10 have been given identical reference numerals with the distinguishing suffix "a" added. Thus, there is shown in FIG. 3 a rotary seal 10a arranged to restrict fluid leakage along a shaft 11a through an opening 12a in a housing 13a. The shaft 11a and the housing 13a are relatively rotatable with it being assumed that the shaft rotates relative to the stationary housing.

The seal 10a includes a rotor 20a secured to the shaft 11a by a clamp sleeve 21a which locks the rotor against a shoulder 22a formed on the shaft 11a. An O-ring seal 23a is interposed between the shoulder 22a and the rotor. The rotor 20a includes a seal ring 25a having a radially extending sealing surface 26a.

Cooperating with the rotor 20a is a stator 30a having a sealing surface 31a facing and in engagement with the sealing surface 26a. The stator 30a is sealed to the housing 13a through a cup 32a which surrounds the seal parts and defines a single cartridge. The cup 32a is mounted in the opening 12a and is sealed to the housing by an O-ring seal 33a. The stator 30a is disposed between the rotor 20a and an end wall 34a forming a portion of the cup 32a. A secondary O-ring seal 35a is interposed between the stator 30a and a cylindrical flange 36a formed at the inner end of the end wall 34a. A retaining ring 37a holds all of the parts of the seal 10a within the cup 32a.

To generate the reverse acting or feedback force of the invention in the seal 10a, the stator 30a is mounted for limited rotational movement under the urging of the torque developed by relative rotation of the sealing surfaces 26a, 31a, and a cam and cam follower connection couples the stator 30a and the housing 13a for shifting the stator from the rotor 20a incident to the limited rotational movement. In the exemplary construction, a cam ring 70 is secured against relative rotation within the cup 32 by a pair of oppositely extending pins 48a which fit within axially extending slots 49a formed in the periphery of the cup 32a. The cam ring 70 is formed with a pair of diametrically opposed, shallow, symmetrical cam surfaces 71 which face the cup end wall 34a. A friction reducing thrust bearing 50a is interposed between the cam ring 70 and the rotor 20a to block axial movement of the cam ring.

The cam followers take the form of miniature ball bearings 72 which ride on the cam surfaces 71 and are secured by posts 73 to a gimbal ring 74. The gimbal ring 74 is pivoted on the stator 30a by a pair of pins 75 secured in the periphery of the stator so as to lie within yoke slots 76 formed in the gimbal ring 74. The disposition of the pin 75 and the slots 76 define an axis for pivoting the gimbal ring 74 on the stator 30a that is substantially at right angles to a line through the cam follower posts 73. There is thus provided a universal connection between the cam ring 70 and the stator 30a which permits approximately a 5° tilt between the cam ring and the stator. This universal, tilting connection accommodates the seal 10a for effective operation with a rotor whose sealing surface is somewhat tilted with respect to the axis of the seal. The yoke slots 76 facilitate easy assembly and disassembly of the seal parts.

To establish initial contact between the sealing surfaces 26a, 31a, an annular wave spring 60a is interposed between the stator 30a and the cup end wall 34a.

Operation of the seal 10a is virtually identical to the operation of the seal 10 described above. Upon development of a force urging the stator 30a towards the rotor 20a, a torque is exerted on the stator by the frictional engagement between the sealing surfaces 26a, 31a. This torque causes a slight rotational movement of the stator 30a in the direction of rotation of the shaft 11a, with the result that the gimbal ring 74 is rotated with the stator and the cam followers 72 ride along the cam surfaces 71 so as to urge the gimbal ring, and thus the stator 30a, away from the rotor 20a. There is thus developed a feedback force resulting from the frictional engagement at the sealing surfaces 26a, 31a. The self-limiting quality and effect of this feedback force is as described above in connection with the seal 10.

It is of significance to note, however, that the symmetrical conformation of the cam surfaces 71 allows the seal 10a to function with equal effectiveness upon rotation of the shaft 11a relative to the housing 13a in either direction. That is, a feedback force is developed upon relative rotation between the gimbal ring 74 and the cam ring 70 in either direction since the cam surfaces 71 are symmetrical. The thrust bearing 50a permits the seal 10a to operate effectively upon slight axial movement of the shaft 11a relative to the housing 13a, and under conditions where the shaft rotates with a slight eccentricity relative to the housing. As previously discussed, the universal connection between the cam ring 70 and the stator 30a allows the seal to operate with complete effectiveness even in view of a slightly tilted disposition of the rotor sealing surface 26a relative to the axis of the stator 30a.

It will be appreciated, of course, that seals of the present invention not only may be used in applications where the fluid pressure reaches levels heretofore much too high for a face type seal, but that the feedback action of the present seals greatly increases the service life of the seals whether utilized in high or average pressure applications. That is, the feedback force tends to minimize the frictional engagement between the sealing surfaces so that wear is controlled.

In the following claims, the terms "rotor" and "stator" have been used simply for convenience in identification and with no intent to imply that the "rotor" and the parts on which it is mounted always rotate while the "stator" and the parts to which it is secured are always stationary. Relative rotation is what is required, and hence the claimed "stator" may rotate relative to the claimed "rotor" as well as vice versa.

I claim as my invention:

1. A rotary seal for restricting fluid linkage along a shaft passing through a relatively rotatable housing comprising, in combination, an annular rotor secured to said shaft and defining a sealing surface, an annular stator surrounding said shaft and having a sealing surface facing said rotor sealing surface, means for establishing a fluid seal between said stator and said housing, means for urging said surfaces into sealing engagement so that relative rotation between said rotor and said stator creates a torque tending to rotate the stator relative to said housing, said stator being mounted for limited rotational movement relative to said housing under the urging of said torque, and means including a pair of elements for converting relative rotation of said elements into relative axial movement of the elements, said means being interposed between said stator and said rotor with one of said elements being coupled for rotation with said stator and the other of said elements acting axially against said rotor.

2. A rotary seal for restricting fluid leakage along a shaft passing through a relatively rotatable housing comprising, in combination, an annular rotor secured to said shaft and defining a sealing surface, an annular stator surrounding said shaft and having a sealing surface facing said rotor sealing surface, means for establishing a fluid seal between said stator and said housing, means for urging said surfaces into sealing engagement so that relative rotation between said rotor and said stator creates a torque tending to rotate the stator relative to said housing, said stator being mounted for limited rotational movement relative to said housing under the urging of said torque, and a plurality of peripherally spaced, axially inclined pins coupling said stator and said housing for urging the stator from said rotor incident to said limited rotational movement.

3. A rotary seal for restricting fluid leakage along a shaft passing through a relatively rotatable housing comprising, in combination, an annular rotor secured to said shaft and defining a sealing surface, an annular stator surrounding said shaft and having a sealing surface facing said rotor sealing surface, means for establishing a fluid seal between said stator and said housing, means for urging said surfaces into sealing engagement so that relative rotation between said rotor and said stator creates a torque tending to rotate the stator relative to said housing, said stator being mounted for limited rotational movement relative to said housing under the urging of said torque, and a cam and a cam follower on said cam coupling said stator and said housing for urging the stator from said rotor incident to said limited rotational movement.

4. A rotary seal for restricting fluid leakage along a shaft passing through a relatively rotatable housing comprising, in combination, an annular rotor secured to said shaft and defining a radially extending sealing surface, an annular stator surrounding said shaft and having a radially disposed sealing surface in contact with said rotor sealing surface, means for establishing a fluid seal between said stator and said housing so that fluid under pressure on one side of said contacting surfaces develops a fluid force urging said surfaces together with the result that relative rotation between the rotor and the stator creates a torque tending to rotate the stator relative to the housing, said stator being mounted for limited rotational movement relative to said housing under the urging of said torque, and means including a pair of elements for converting relative rotation of said elements into relative axial movement of the elements, said means being interposed between said stator and said rotor with one of said elements being coupled for rotation with said stator and the other of said elements acting axially against said rotor, whereby the effect of said fluid force in urging said surfaces together is self-limiting.

5. A rotary seal for restricting fluid leakage along a shaft passing through a relatively rotatable housing comprising, in combination, an annular rotor secured to said shaft and defining a radial sealing surface, an annular stator being sealed to said housing and having a sealing surface facing said rotor sealing surface, a pivot ring secured against rotation and axial movement relative to said housing and having a plurality of annular spaced sockets, and a plurality of pins each having one end fitted into one of said sockets and the other end fixed relative to said stator so that relative rotation between said sealing surfaces tends to rotate said stator in a direction straightening said pins.

6. A rotary seal for restricting fluid leakage along a shaft through a relatively rotatable housing comprising, in combination, an annular rotor secured to said shaft and defining a radial sealing surface, an annular stator being sealed to said housing and having a sealing surface facing said rotor sealing surface, a pivot ring secured against rotation relative to said housing and having a plurality of annular spaced sockets, a friction reducing thrust member interposed between said rotor and said pivot ring, a plurality of pins each having one end fitted into one of said sockets and the other end fixed relative to said stator so that relative rotation between said sealing surfaces tends to rotate said stator in a direction straightening said pins, a main spring acting against said stator to urge said faces into engagement, and a preload spring acting against said pivot ring to urge it axially from said thrust member.

7. A rotary seal for restricting fluid leakage along a shaft passing through a relatively rotatable housing comprising, in combination, an annular rotor secured to said shaft and defining a radial sealing surface, an annular cup sealed in said housing and surrounding said rotor, said cup having an end wall facing and axially spaced from said rotor, an annular stator disposed between said rotor and said end wall, said stator being sealed to said cup and having a sealing surface facing said rotor sealing surface, a pivot ring secured against rotation and axial movement within said cup and having a plurality of annular spaced sockets facing said end wall, and a plurality of pins each having one end fitted into one of said sockets and the other end fixed relative to said stator so that relative rotation between said sealing surfaces tends to rotate said stator in a direction straightening said pins.

8. A rotary seal for restricting fluid leakage along a shaft passing through a relatively rotatable housing comprising, in combination, an annular rotor secured to said shaft and defining a radial sealing surface, an annular stator being sealed to said housing and having a sealing surface facing said rotor sealing surface, a pivot ring secured against rotation and axial movement relative to said housing and having a plurality of annular spaced sockets, a friction reducing thrust member interposed between said rotor and said pivot ring, a flexible radially extending member secured to said stator, a pin spacer secured to said stator and having a plurality of openings corresponding to but annularly spaced from said sockets, a plurality of pins each having one end fitted into one of said sockets and the other end passing through the corresponding one of said openings into contact with said flexible member so that relative rotation between said sealing surfaces tends to rotate said stator in a direction straightening said pins, and a preload spring acting against said pivot ring to urge it axially from said thrust member.

9. A rotary seal for restricting fluid leakage along a shaft passing through a relatively rotatable housing comprising, in combination, an annular rotor secured to said shaft and defining a radial sealing surface, an annular cup sealed in said housing and surrounding said rotor, said cup having an end wall facing and axially spaced from said rotor, an annular stator disposed between said rotor and said end wall, said stator being sealed to said cup and having a sealing surface facing said rotor sealing surface, a pivot ring secured against rotation within said cup and having a plurality of annular spaced sockets facing said end wall, a friction reducing thrust member interposed between said rotor and said pivot ring, a flexible radially extending member secured to said stator, a pin spacer secured to said stator and having a plurality of openings corresponding to but annularly spaced from said sockets, and a plurality of pins each having one end fitted into one of said sockets and the other end passing through the corresponding one of said openings into contact with said flexible member so that relative rotation between said sealing surfaces tends to rotate said stator in a direction straightening said pins.

10. A rotary seal for restricting fluid leakage along a shaft passing through a relatively rotatable housing comprising, in combination, an annular rotor secured to said shaft and defining a radial sealing surface, an annular stator being sealed to said housing and having a sealing surface facing said rotor sealing surface, a cam ring having a pair of diametrically opposed shallow symmetrical cam surfaces, a follower ring having a pair of cam followers disposed in engagement with respective ones of said cam surfaces, means mounting said cam ring and follower ring in force transmitting relation to said stator so that rotation of the stator causes said surfaces and followers to urge the stator from said rotor, said means including a pivotal gimbal connection permitting rotation upon an axis substantially at right angles to a line through said cam followers, and a spring interposed between said end wall and said stator to urge said faces into engagement.

11. A rotary seal for restricting fluid leakage along a shaft passing through a relatively rotatable housing comprising, in combination, an annular rotor secured to said shaft and defining a radial sealing surface, an annular cup sealed in said housing and surrounding said rotor, said cup having an end wall facing and axially spaced from said rotor, an annular stator disposed between said rotor and said end wall, said stator being sealed to said cup and having a sealing surface facing said rotor sealing surface, a friction reducing thrust member disposed within said cup against said rotor, a cam ring disposed in said cup and having a pair of diametrically opposed shallow symmetrical cam surfaces, a pair of cam followers disposed in engagement with respective ones of said cam surfaces, said cam ring and said cam followers being interposed in force transmitting relation between said thrust member and said stator, and a spring interposed between said end wall and said stator to urge said faces into engagement.

12. A rotary seal for restricting fluid leakage along a shaft passing through a relatively rotatable housing comprising, in combination, an annular rotor secured to said shaft and defining a radial sealing surface, an annular cup sealed in said housing and surrounding said rotor, said cup having an end wall facing and axially spaced from said rotor, an annular stator disposed between said rotor and said end wall, said stator being sealed to said cup and having a sealing surface facing said rotor sealing surface, a cam ring secured against rotation within said cup and having cam surfaces facing said end wall, a friction reducing thrust member interposed between said rotor and said cam ring, a cam follower connected to said stator and disposed in engagement with said cam surfaces, and a spring interposed between said end wall and said stator to urge said faces into engagement.

13. A rotary seal for restricting fluid leakage along a shaft passing through a relatively rotatable housing comprising, in combination, an annular rotor secured to said shaft and defining a radial sealing surface, an annular stator being sealed to said housing and having a sealing surface facing said rotor sealing surface, a cam ring secured against rotation relative to said housing and having a pair of diametrically opposed, shallow, symmetrical cam surfaces, a friction reducing thrust member interposed between said rotor and said cam ring, a gimbal ring surrounding said stator and carrying a pair of cam followers in engagement with said cam surfaces, means defining a pivotal connection between said gimbal ring and said stator permitting rotation about an axis substantially at right angles to a line through said cam followers, and a spring interposed between said end wall and said stator to urge said faces into engagement.

14. A rotary seal for restricting fluid leakage along a shaft passing through a relatively rotatable housing comprising, in combination, an annular rotor secured to said shaft and defining a radial sealing surface, an annular cup sealed in said housing and surrounding said rotor, said cup having an end wall facing and axially spaced from said rotor, an annular stator disposed between said rotor and said end wall, said stator being sealed to said cup and having a sealing surface facing said rotor sealing surface, a cam ring secured against rotation within said cup and having a pair of diametrically opposed, shallow, symmetrical cam surfaces facing said end wall, a friction reducing thrust member interposed between said rotor and said cam ring, a gimbal ring surrounding said stator and carrying a pair of cam followers in engagement with said cam surfaces, means defining a pivotal connection between said gimbal ring and said stator permitting rotation about an axis substantially at right angles to a line through said cam followers, and a spring interposed between said end wall and said stator to urge said faces into engagement.

References Cited by the Examiner
UNITED STATES PATENTS 3,052,475   9/62   Carfagna _____ 277—93

LEWIS J. LENNY, *Primary Examiner.*

EDWARD V. BENHAM, *Examiner.*

UNITED STATES PATENT OFFICE
CERTIFICATE OF CORRECTION

Patent No. 3,198,529            August 3, 1965

Robert M. Voitik

It is hereby certified that error appears in the above numbered patent requiring correction and that the said Letters Patent should read as corrected below.

In the grant, lines 2 and 3, and lines 12 and 13, and in the heading to the printed specification, lines 3 and 4, name of assignee, for "Continental Illinois National Bank and Trust Company of Chicago", each occurrence, read -- Continental Illinois National Bank and Trust Company of Chicago, as trustee --.

Signed and sealed this 18th day of January 1966.

(SEAL)
Attest:

ERNEST W. SWIDER            EDWARD J. BRENNER
Attesting Officer            Commissioner of Patents